United States Patent [19]

Seymour et al.

[11] Patent Number: 5,286,013
[45] Date of Patent: Feb. 15, 1994

[54] VIBRATION DAMPER ASSEMBLY

[75] Inventors: John R. Seymour, Lowell; Craig M. Gardner, Danvers; Kenneth V. Wellner, Westminster; James J. Luz, Tewksbury, all of Mass.

[73] Assignee: General Electric Company, Schenectady, N.Y.

[21] Appl. No.: 27,584

[22] Filed: Mar. 5, 1993

Related U.S. Application Data

[63] Continuation of Ser. No. 860,606, Mar. 30, 1992, abandoned, which is a continuation of Ser. No. 611,795, Nov. 13, 1990, abandoned.

[51] Int. Cl.$^5$ .............................................. F16F 9/26
[52] U.S. Cl. .................................. 267/220; 188/311; 188/316; 188/318; 188/322.5; 248/562; 248/636; 267/140.13
[58] Field of Search ........... 267/217, 219, 220, 140.11, 267/140.13, 64.15, 64.25, 124; 188/311, 313, 316, 318, 322.5, 312, 321.11; 248/562, 636; 280/709, 710; 180/300, 312, 902

[56] References Cited

U.S. PATENT DOCUMENTS

| | | | |
|---|---|---|---|
| 625,454 | 5/1899 | Maxim | 188/312 X |
| 1,078,060 | 11/1913 | Newman | 188/318 |
| 1,373,332 | 3/1921 | Ike et al. | 188/311 |
| 1,434,197 | 10/1922 | Brown, Jr. | 188/316 |
| 1,822,026 | 9/1931 | Guy . | |
| 2,359,917 | 10/1944 | Hussman | 248/20 |
| 2,514,137 | 7/1950 | O'Connor | 188/90 |
| 2,661,915 | 12/1953 | O'Connor | 244/103 |
| 3,462,136 | 8/1969 | Rumsey | 267/1 |
| 3,464,290 | 9/1969 | Van Den Brink | 74/574 |
| 3,682,461 | 8/1972 | Wachenheim | 267/31 |
| 3,823,619 | 7/1974 | Shotwell | 74/574 |
| 4,172,510 | 10/1979 | Forkel | 188/1 B |
| 4,194,598 | 3/1980 | Suozzo | 188/134 |
| 4,226,303 | 10/1980 | Thoma | 188/1 B |
| 4,415,148 | 11/1983 | Mair et al. | 267/122 |
| 4,546,960 | 10/1985 | Abrams et al. | 267/136 |
| 4,576,366 | 3/1986 | Gallas et al. | 267/8 R |
| 4,627,635 | 12/1986 | Koleda | 280/602 |
| 4,638,895 | 1/1987 | Taylor et al. | 188/280 |
| 4,651,980 | 3/1987 | Morita et al. | 267/140.1 |
| 4,702,346 | 10/1987 | Uno et al. | 181/207 |
| 4,765,600 | 8/1988 | Härtel | 267/122 |
| 4,773,632 | 9/1988 | Härtel | 267/140.1 |
| 4,778,028 | 10/1988 | Staley | 181/208 |

FOREIGN PATENT DOCUMENTS

| | | | |
|---|---|---|---|
| 453720 | 12/1927 | Fed. Rep. of Germany | 188/313 |
| 490402 | 1/1930 | Fed. Rep. of Germany | 267/64.15 |
| 1455180 | 3/1969 | Fed. Rep. of Germany | 267/64.15 |
| 3738716 | 9/1988 | Fed. Rep. of Germany | 180/312 |
| 6716671 | 6/1968 | Netherlands | 188/321.11 |
| 798386 | 1/1981 | U.S.S.R. | 188/322.5 |

*Primary Examiner*—George E. A. Halvosa
*Attorney, Agent, or Firm*—Nixon & Vanderhye

[57] ABSTRACT

A vibration damper assembly is provided which includes a first attachment element or bracket for securing the damping mechanism to a first component, the vibrations of which are to be damped. A visco-elastic spacer is secured to the element or bracket at one end, and to a cylinder of a piston/cylinder assembly at its other end. A piston is slidably received in the cylinder with a predetermined clearance between the peripheral surface of the piston and the cylinder wall. A piston rod extending from the piston and the opposite end of the cylinder is received within a housing of a viscous damping device, the piston rod having a plurality of discs mounted thereon in predetermined, spaced relationship. An interior wall of the housing is also formed with a plurality of disc-like surfaces projecting toward the radial center of the housing, with aligned apertures therein to accommodate the piston rod. The other or remote end of the viscous damper housing is secured to a second attachment element or bracket by which the damper is secured to a second component. The assembly is designed especially to damp extremely low amplitude vibrations, to accommodate long term displacement or creep between the components, and to withstand dynamic shock.

21 Claims, 1 Drawing Sheet

VIBRATION DAMPER ASSEMBLY

This invention was developed in conjunction with a U.S. Government contract, and the Government therefore has certain rights to the invention.

This is a continuation of application Ser. No. 07/860,606, filed Mar. 30, 1992, which is a continuation of application Ser. No. 07/611,795, filed Nov. 13, 1990, both now abandoned.

BACKGROUND AND SUMMARY OF THE INVENTION

It is a well known practice in certain engineering design developments to devote substantial efforts toward eliminating or at least minimizing structural vibration, or noise as it is commonly called, in mechanical components. Such developments range from rotating machine components such as those in turbine engines to sensitive electronic components. A solution to such vibration problems is often achieved with the use of carefully placed discrete vibration dampers.

A common class of discrete vibration dampers serve to dissipate vibrational energy by transforming kinetic vibration energy into thermal energy, which in turn is harmlessly dissipated into the surroundings. Some such devices reduce the transmission of noise by utilizing a shearing action of a highly viscous fluid. Viable fluid based damper designs employ pressure differentials to force the damper fluid through a confined area where the viscous shearing takes place (such as through an orifice). These designs are effective at damping relatively large amplitudes of vibration, but are less effective and oftentimes wholly ineffective with extremely low amplitude vibrations such as those associated with stringent vibration specifications. In the event of small vibration amplitudes, such existing designs are unable to force the damping fluid through the internal energy dissipation paths because they are unable to produce the required internal pressure differentials. Discrete dampers of this type often require several visco-elastic seals to contain the fluid within the damper fixture. Consequently, in the event of extremely low vibration amplitudes, the visco-elastic seals yield before sufficient internal pressures can be developed to initiate viscous shearing action.

The present invention was developed in accordance with certain specific requirements discussed below and by meeting these requirements, problems associated with prior techniques have been overcome.

One requirement is that the damper be capable of successful operation in the event that the two structures or components connected by the damper have long term relative displacement or creep between them. This essentially requires the damper to be capable of repositioning its inner damping mechanism during long term (months and possibly years) fluctuations in the relative distance between the two components or structures.

A second requirement is that the damper assembly dissipate not only medium-to-high amplitude vibrations, but also and especially extremely low amplitude vibrations.

A third requirement is that the damper be capable of maintaining its structural integrity during a dynamic shock event, for example of the type experienced by naval shipboard equipment. Such an event could invoke excessive impulse forces on the damper. Existing damper designs, in addition to their inability to satisfactorily dissipate low amplitude vibration, are not likely to survive large impulsive forces characteristic of dynamic shock.

The present invention provides a damper assembly that meets all of the above requirements. Specifically, the damper assembly of this invention is a tunable design, capable of dissipating high but especially extremely low amplitude vibration while also having both the ability to reposition itself in the event of long term relative displacement, between connected structures, and to withstand dynamic shock.

In an exemplary embodiment of the invention, the damper assembly of this invention is comprised of three components: (1) a tuned visco-elastic spacer; (2) a sealed piston/cylinder assembly; and (3) a viscous damping mechanism.

More specifically, the damping assembly according to this invention includes a first attachment element or bracket for securing the damping mechanism to a structure, the vibration of which is to be damped. A tuned visco-elastic spacer block is secured to the element or bracket at one end, and to a cylinder of a piston/cylinder assembly at its other end. A piston is slidably received in the cylinder with a predetermined clearance between the peripheral surface of the piston and the cylinder wall. A fluid line extends from the cylinder to connect cylinder chambers above and below the piston. This fluid line is also provided with a pressure relief valve for a purpose described further herein. A piston rod extending from the piston and through the opposite end of the cylinder is received within a housing of a viscous damping device, the piston rod having a plurality of discs mounted thereon in a predetermined, spaced relationship. An interior wall of the housing is also formed with a plurality of disc-like surfaces projecting toward the radial center of the housing, with aligned apertures therein to accommodate the piston rod.

The other or remote end of the viscous damping housing is secured to a second attachment element or bracket by which the damper is secured to a stationary supporting (relative to the vibrating structure) surface or substrate.

The arrangement of piston rod discs, and housing discs, is such that the respective groups of discs are interdigitated, with a close axial spacing between adjacent piston and housing discs. It is well understood that relative axial movement between the groups of discs causes the viscous fluid to be compressed between the discs, resulting in a high velocity viscous shearing of the fluid, and hence energy dissipation through the generation of heat.

The above described elements or components of the damper are thus connected in series and dissipate energy as described below. For the occurrence of long term creep and/or extremely low frequency vibrations, the piston and cylinder move relative to each other with minimal force transmitted to the lower portions of the structure, i.e., to the viscous damping mechanism. Thus, equilibrium is substantially maintained between the fluid in the upper and lower chambers of the piston/cylinder assembly because of the slow relative motion of the cylinder relative to the piston permitted by reason of the predetermined clearance between the piston and the cylinder side wall. Springs located in upper and lower portions of the viscous damping housing tend to bring the discs back to their original equilibrium position to insure consistent damping performance.

For low (and high) frequency vibration, the piston/cylinder side wall clearance is sufficiently small to restrict increased fluid velocity within the clearance. Thus, alternating high and low pressures will be developed in the upper and lower chambers of the cylinder, thereby transferring force between the piston and the surrounding cylinder, so that they act as a substantially rigid unit. This force transmission will ultimately result in axial movement of the piston rod and consequent fluid shearing action in the viscous damping mechanism below the piston/cylinder assembly to thereby dissipate the kinetic vibration energy.

The dynamic shock requirements of the damper are addressed by incorporating the relief valve in the fluid line arrangement into the cylinder walls on either side of the piston. For a severe shock event, large pressures would develop in either the upper or lower piston chamber. The valve within the line located in the side of the cylinder would be adjusted to open at a certain predetermined pressure, thus allowing rapid fluid flow between the upper and lower chambers of the piston/cylinder assembly. This would eliminate any force build-up within the damper which could otherwise adversely effect the damping mechanism.

The above described assembly is tunable in two ways. First, the viscous damping device can be designed to deliver a level of damping dictated by the specific application. This may be achieved by providing appropriate spacing between the discs of the damping device, since this controls the level of damping.

Second, the assembly as a whole may be designed to have a certain natural frequency which eliminates the possibility of a "short" for high frequency vibration between the two structures interconnected by the damper assembly. The natural frequency of the assembly can be varied by careful selection and design of the visco-elastic spacer. In other words, it is possible to match the stiffness of the spacer with the mass of the piston/cylinder and viscous damping device to create the natural frequency in accordance with specific applications so that energy at frequencies above the natural frequency is not transmitted through the damper assembly. Thus, the assembly has the characteristics of a low pass filter.

The device does not damp extremely low frequency vibrations, which are, in fact, accommodated as long term creep by the assembly. The device also does not dissipate high frequency vibrations, i.e., vibrations at a frequency higher than the natural frequency of the assembly as discussed previously.

Thus, in accordance with one exemplary embodiment of the invention, therefore, there is provided a tunable vibration damper assembly comprising (a) a visco-elastic spacer; (b) a piston and cylinder assembly including a piston rod attached at one end to the piston and having a free end extending out of one end of the cylinder, wherein the visco-elastic spacer is attached to the other end of said cylinder; and (c) a viscous damping device operatively attached to the end of the piston rod.

In another aspect, the invention provides a vibration damper assembly adapted to dissipate kinetic energy from at least extremely low amplitude vibrations comprising: an elastic spacer connected at one end to a structure whose vibrations are to be damped, and at the other end to a cylinder of a piston/cylinder assembly; the cylinder enclosing a piston therein defining variable volume chambers in said cylinder above and below said piston; a piston rod extending from said piston, through said cylinder and into a viscous damper housing, wherein said piston rod and an interior surface of said viscous damper housing are provided with interdigitated damping means.

Other objects and advantages of the subject invention will become apparent from the detailed description which follows.

DETAILED DESCRIPTION OF THE DRAWINGS

Figure 1:
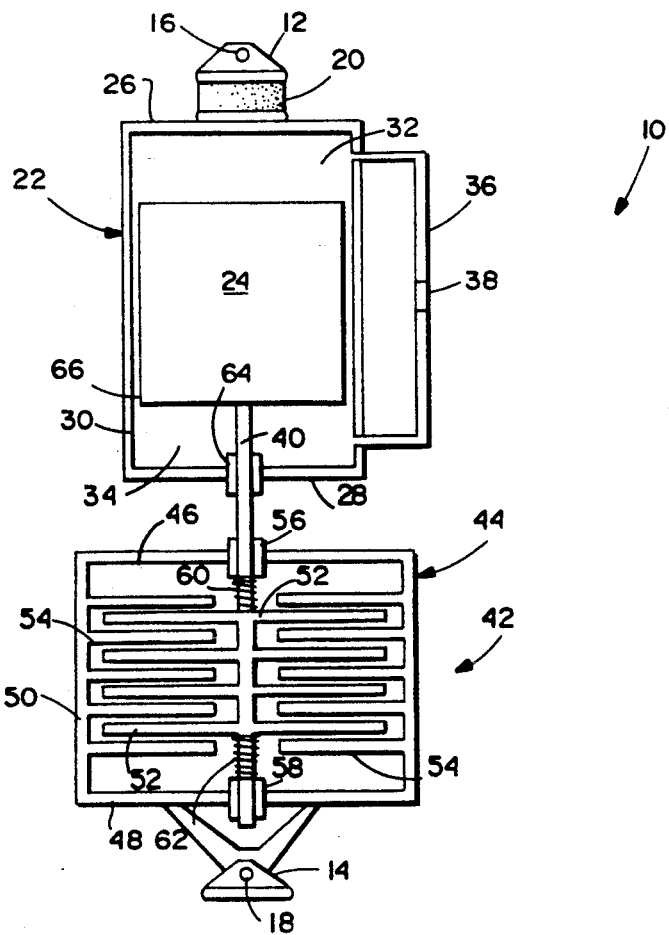
FIG. 1 is a diagrammatic side view of a tunable damper assembly in accordance with this invention.

Referring to FIG. 1, the tunable vibration damper assembly 10 is arranged between a pair of attachment brackets or mechanisms 12 and 14. The upper bracket or attachment point 12 would typically be secured to a first structure or component whose vibrations are to be damped. The lower attachment bracket 14 is designed to be secured to a second structure, e.g., a supporting substrate or surface (not shown) which would normally (but not necessarily) be stationary relative to the first structure. In either case, the attachments may be of a pivotal nature as indicated by reference numerals 16 and 18. This arrangement would accommodate angular movement of either or both component structures where only the linear component of such motion is to be damped by the vibration damper assembly.

A tunable visco-elastic spacer member 20 is connected to the upper attachment bracket 12 by any suitable means. The spacer member itself may be constructed of a visco-elastic rubber or other suitable material (which behaves like a spring), the geometry and dimensions of which will depend upon the specific application for the damper assembly. In other words, since the visco-elastic spacer 20 behaves like a spring, its characteristic "spring rate" can be altered as desired as a function of size, shape and composition. The spring rate would then be chosen to produce a damper assembly natural frequency depending on the application as described in greater detail below.

The visco-elastic spacer 20 is secured at its lower end to a cylinder 22 which encloses a piston 24. The cylinder 22 includes a pair of end walls 26, 28 and a peripheral side wall 30, and is filled with a viscous fluid. The piston 24 and cylinder 22 are movable relative to one another such that variable volume chambers 32 and 34 are established, respectively, above and below the piston 24. A fluid conduit 36 extending from the side wall 30, of the cylinder 22, connects the chambers 32 and 34. A relief valve 38 is positioned in the conduit 36 and is calibrated to open at a predetermined fluid pressure level, as described in further detail below.

It is significant that the upper portion of the cylinder defining chamber 32 is devoid of any seals, allowing pressure to develop in the chamber so as to permit force transferal between the cylinder wall and piston under extremely low amplitude vibrations, unlike the previously described prior art arrangements.

A piston rod 40 extends from the lower end of the piston and projects beyond the lower wall of the cylinder and into a viscous damping mechanism or device 42 which includes an outer housing 44 including top and bottom walls 46, 48 and a side wall 50. The damping mechanism includes a plurality of disks 52 rigidly attached to the piston rod 40 in vertically spaced relationship. At the same time, the housing 44 is provided with a plurality of disks 54 which are interdigitated with the disks 52, so that a predetermined clearance exists between adjacent ones of the disks 52 and 54. The housing 44 is substantially filled with a high viscosity fluid such as gear oil or other suitable fluid, e.g., a silicon fluid. As described above, relative axial movement between the discs 52 and 54 will result in viscous shearing of the fluid with consequent energy dissipation in a manner well understood by those skilled in the art.

The piston rod 40 is sealed relative to the housing 44 by means of seals 56 and 58. Repositioning springs 60, 62 are located between the seals 56, 58, respectively, and the nearest disks 52. These springs tend to maintain the disks 52 in a stable and centered relationship with respect to the disks 54. A third seal 64 prevents any leakage from the cylinder 22 where the piston rod 40 projects from the cylinder.

Figure 2A:
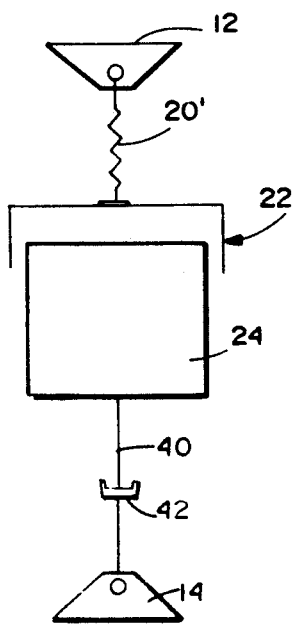
FIG. 2A is a system dynamics diagram representing the damper assembly behavior for long term displacement or at extremely low frequency vibration.
Figure 2B:
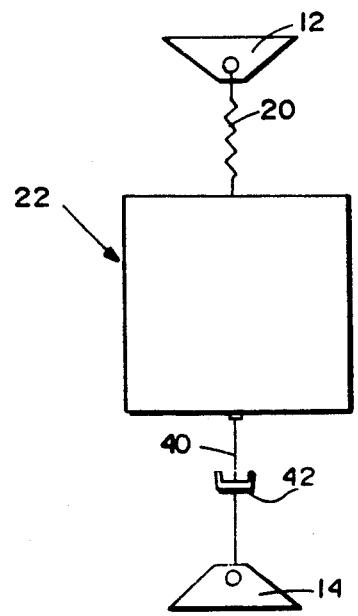
FIG. 2B is a system dynamics diagram representing the damper assembly behavior at mid to high frequency vibration, but below the natural frequency of the assembly.

With reference also now to FIGS. 2A and 2B, the operation of the vibration damper assembly 10 will be described under various operating conditions. In order to accommodate long term displacement or extremely low frequency (near static) vibrations, the cylinder 22 will move relative to the piston 24 which, in turn, will remain substantially stationary. In other words, and as indicated in the dynamic diagram of FIG. 2A, the visco-elastic spacer 20' and the cylinder 22 are, in effect, decoupled from the piston 24 and the viscous damping device 42. This is because for long term displacement or extremely low frequency vibration, the clearance 66 between the piston 24 and the side wall 30 of the cylinder 22 is sufficient to permit the low velocity fluid to flow between the chambers 32 and 34 on either side of the piston. At the same time, the springs 60 and 62 also tend to maintain piston 24 (via piston rod 40) in a state of equilibrium so that the discs of the damping device 42 will tend to remain in, or be restored to, its original position, i.e., unaffected by long term displacements.

Under higher frequency vibration conditions, but below the natural frequency, and under a range of amplitude vibration conditions, and especially extremely low amplitude conditions, the piston/cylinder side wall clearance 66 is insufficient to accommodate the increased flow velocity. As a result, alternating high and low pressures will be developed in the upper and lower chambers 32, 34 thereby causing the piston and cylinder assembly to move together as a rigid unit relative to the viscous damper housing 42. With reference to FIG. 2B, the cylinder 22, piston 24 and piston rod 40 are, in effect, joined as a rigid unit for frequencies below the damper's natural frequency. As a result, the discs 52 will move axially relative to the discs 54, and the viscous fluid within the housing 44 will be sheared, thereby generating heat and dissipating the vibratory energy below the damper's natural frequency. This damping action is enhanced by the lack of any potentially yieldable seal in the upper chamber 32, so that pressures are allowed to develop in the upper chamber.

In the event of a dynamic shock, large pressures will be rapidly developed in either the upper chamber 32 or the lower chamber 34. At a certain predetermined pressure level, the relief valve 38 will open to permit rapid flow of fluid between the upper and lower chambers 32, 34, respectively. This arrangement serves to eliminate any significant force buildup which could otherwise adversely effect the damping mechanism 42.

Finally, any resonance within the system itself can be controlled by the tuned visco-elastic spacer 20. Specifically, (and as noted above) by a judicious selection of the spacer element 20, including its geometry, dimensions, and/or composition, and in consideration of the mass of the whole assembly, the resonance of the assembly as a whole can be fine tuned in order to meet specific given requirements. In other words, the damper natural frequency can be tuned to a frequency within the required specifications set for the damper assembly 10, so that energy at frequencies above the natural frequency are blocked.

As also described above, tuning to specific requirements can also be achieved by designing the viscous damping mechanism or device 42 so that an appropriate, predetermined clearance is provided between the discs 52, 54.

The above described vibration damper assembly has specific applicability on Naval main propulsion units and turbine/generator sets, but it is to be understood that the assembly has general applicability to any structure or component where stringent vibration specifications must be met.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vibration damper assembly for attachment between a vibrating structure at one end and a supporting substrate at another opposite end, the damper assembly capable of simultaneously camping vibrations under a range of amplitude conditions while accommodating long term creep and dynamic shock and having a tunable natural frequency comprising:
    (a) a visco-elastic element for providing natural frequency tunability having first and second ends, the first end of which is adapted for attachment to the vibrating structure;
    (b) a piston and cylinder assembly for accommodating long term creep and dynamic shock and including a cylinder, one end of said cylinder being attached to said second end of said visco-elastic element a piston movable relative to said cylinder to establish a pair of variable volume chambers therein with a relief line connecting said variable volume chambers; and a piston rod attached at one end to the piston, said piston rod having a free end extending out of the other end of the cylinder; and
    (c) a viscous damping component for damping vibrations under a range of amplitude conditions, said viscous damping component axially spaced from said cylinder and operatively attached to the free end of the piston rod, said viscous damping component including a first portion fixed to said free end of said piston rod and received within a second portion movable relative to said first portion, and means on said second portion for attaching said second portion of said viscous damping component to said supporting substrate, and wherein during damping of the vibrations under the range of amplitude conditions, said piston and cylinder move as a rigid unit.

2. The assembly of claim 1 wherein said relief line is provided with a pressure actuated relief valve to accommodate abnormal dynamic shock conditions.

3. The assembly of claim 1 wherein sufficient clearance is provided between the piston and cylinder to permit fluid to pass therebetween under extremely low frequency vibration conditions.

4. The assembly according to claim 1 wherein the viscous damping component includes a housing including a first plurality of vertically spaced annular disks, each of which has a central aperture therein; and a second plurality of disks interdigitated with said first plurality of disks, said second plurality of disks fixedly attached to said piston rod.

5. The assembly according to claim 4 wherein said piston rod extends through said housing and through said central apertures in said first plurality of disks.

6. The assembly according to claim 5 wherein said piston rod extends through opposite end walls of said housing, and further wherein at least one seal is provided between said piston rod and one of said opposite end walls.

7. The assembly according to claim 6 wherein biasing means are located between said at least one seal and an adjacent one of said first plurality of discs.

8. The assembly according to claim 4 wherein a first mounting element is secured to said visco-elastic element and a second mounting element is secured to said housing.

9. The assembly according to claim 4 wherein said housing is substantially filled with a viscous fluid.

10. The assembly according to claim 1 wherein said visco-elastic element provides a predetermined natural frequency for the assembly, such that energy at frequencies above said natural frequency are not transmitted through the assembly.

11. A vibration damper assembly adapted to dissipate kinetic energy from at least extremely low amplitude vibrations and under conditions of long term creep and abnormal sock comprising: a tunable elastic spacer connected at one end to a structure whose vibrations are to be damped, and at the other end to a cylinder of a piston/cylinder assembly; the cylinder enclosing a piston therein defining variable volume chambers in said cylinder above and below said piston but wherein said piston/cylinder assembly is constructed and arranged so that said piston and cylinder move as a rigid unit under conditions of at least low amplitude vibrations; a piston rod extending from said piston, through said cylinder and into one end of a viscous damper housing, wherein said piston rod and an interior surface of said viscous damper housing are provided with interdigitated damping means for damping the low amplitude vibrations, and further wherein said viscous damper housing is connected at an end opposite said one end to a supporting substrate.

12. The damper assembly according to claim 11 wherein clearance is provided between said piston and a side wall of said cylinder sufficient to permit fluid to flow between said chambers during low frequency vibration conditions.

13. The assembly according to claim 12 wherein said elastic spacer provides a predetermined natural frequency for the assembly, such that frequencies higher than said natural frequency are blocked.

14. The damper assembly according to claim 13 wherein said clearance is insufficient to accommodate rapid fluctuations in pressure resulting in high velocity flow from relatively high frequency vibration conditions, but lower than said natural frequency, such that said piston rod is caused to move axially in said viscous damper housing, to thereby dissipate vibrational energy through said damping means.

15. The damper assembly according to claim 14 wherein a fluid conduit connects said variable volume chambers, and wherein a relief valve is positioned in said fluid conduit, said valve calibrated to open at a predetermined pressure level to thereby permit flow of fluid between said chambers at pressures exceeding said predetermined pressure.

16. The damper assembly according to claim 11 wherein said interdigitated damping means comprise a first plurality of discs attached to said piston rod and a second plurality of discs attached to viscous damper housing.

17. A viscous damper assembly for connection between first and second components comprising:
first elastic means for fine tuning vibrational damping characteristics of the assembly and including first attachment means for attachment to said first component;
second viscous damping means including a damping housing and a damping mechanism for damping at least extremely attachment of said damping housing to a second component; and
third piston/cylinder means for enabling the assembly to accommodate long term relative displacement between said first and second components, and to withstand dynamic shock, said third piston/cylinder means interposed between and operatively connected to said first elastic means and said second viscous damping means, said third piston/cylinder means including a piston rod and a cylinder, wherein said piston rod extends into said damping housing and comprises, and further wherein a component of said second viscous damping means said cylinder is connected to said first elastic means.

18. The damper assembly according to claim 17 wherein said second viscous damping means comprises a plurality of movable discs fixed to said piston rod and interdigitated with a plurality of stationary discs fixed to said damping housing.

19. The damper assembly according to claim 12 wherein said first elastic means comprises a visco-elastic spacer including first attachment means for connection to said first component.

20. The damper assembly according to claim 17 wherein a relief line and associated relief valve operatively connect a pair of chambers within said cylinder on either side of said piston, said relief valve calibrated to open at a predetermined level of fluid pressure to thereby protect said assembly from damage due to dynamic shock.

21. The damper assembly according to claim 20 wherein one of said chambers is devoid of seals.

* * * * *